J. ADAMS.
FUEL ECONOMIZER AND DECARBONIZER FOR INTERNAL COMBUSTION ENGINES.
APPLICATION FILED AUG. 19, 1914.
1,138,828.
Patented May 11, 1915.
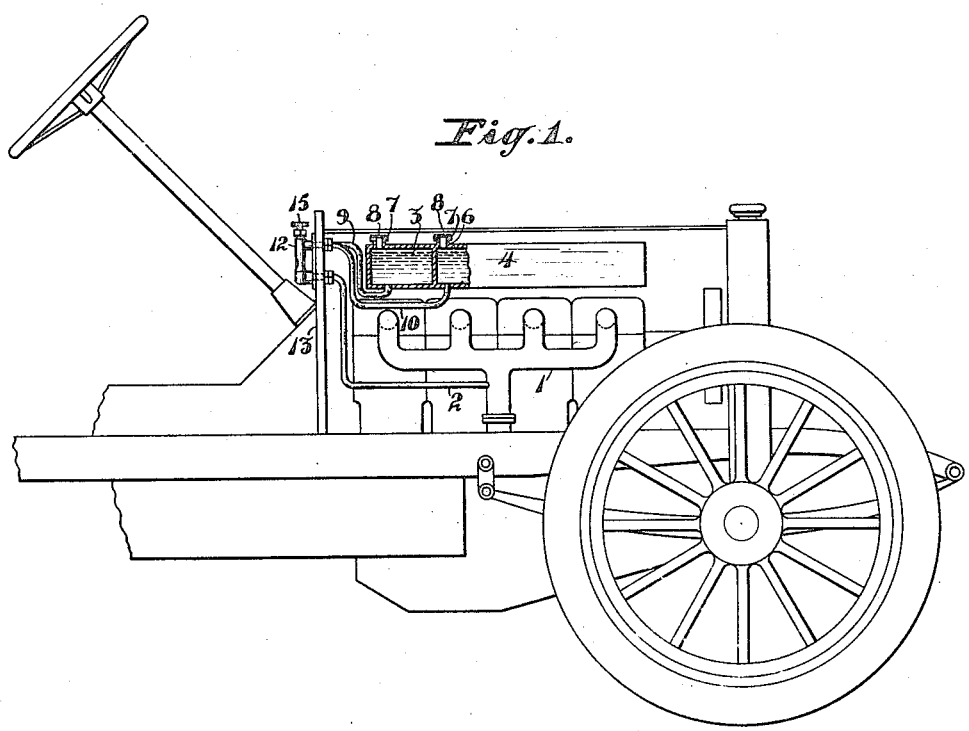
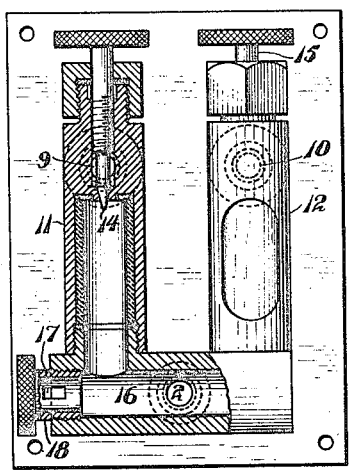
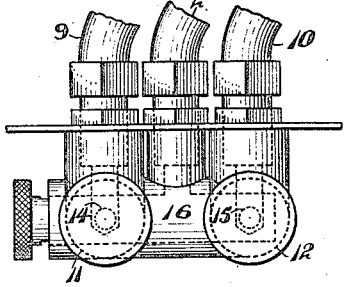
WITNESSES:
F. C. Fliedner
A. Knopf
INVENTOR,
Jack Adams,
BY Francis M. Wright
ATTORNEY.

UNITED STATES PATENT OFFICE.

JACK ADAMS, OF SAN FRANCISCO, CALIFORNIA.

FUEL ECONOMIZER AND DECARBONIZER FOR INTERNAL-COMBUSTION ENGINES.

1,138,828.

Specification of Letters Patent. Patented May 11, 1915.

Application filed August 19, 1914. Serial No. 857,490.

*To all whom it may concern:*

Be it known that I, JACK ADAMS, a citizen of the United States, residing at San Francisco, in the county of San Francisco and State of California, have invented new and useful Improvements in Fuel Economizers and Decarbonizers for Internal-Combustion Engines, of which the following is a specification.

One object of the present invention is to provide means for increasing the power of an internal combustion engine, for reducing the cost of operating the same, for preventing the deposition of carbon in the cylinders and on the valves and spark plugs, thus increasing the life of the engine.

A further object of the invention is to provide means whereby these operating means can be under full control, and regulated as desired.

Referring to the drawing, Figure 1 indicates a broken side view of a front portion of an automobile equipped with my invention; Fig. 2 is an enlarged broken rear view of a portion of the invention; Fig. 3 is a plan view of the same.

Referring to the drawing, 1 indicates the manifold of an automobile engine. Arranged preferably over said manifold are two vessels, a shorter vessel 3 for containing a decarbonizing compound, such as kerosene oil, and a longer vessel 4 for containing water. These vessels are filled through nozzles 6 at the top, the caps 7 of which have vents 8 therethrough. The bottoms of said vessels communicate with conduits 9, 10, which lead to the upper portions of sight feed pipes 11, 12, on the dash board 13 of the automobile, although they may have any suitable location. Said sight feed pipes are controlled by needle valves 14, 15, and are each connected with one terminal portion of a pipe 16, which is centrally connected with a conduit 2 leading to the manifold. Air is admitted to the horizontal pipe 16 through a hole 17 in the side of a short pipe 18 screwed into one end of the horizontal pipe 16, the inner end of said pipe 18 being open, and the outer end being closed, and the size of said hole 17 being varied by screwing the short pipe 18 into the pipe 16.

It will be seen that, by the use of this invention kerosene oil and water, both in the form of spray, together with air, can be drawn into the cylinders by the suction of the engine, that all of these can be regulated independently as desired, and that the rate at which the kerosene oil and water are fed to the engine can be inspected by means of the sight feed valves.

The introduction of air into the manifold not only insures perfect combustion at any altitude without adjusting the carbureter, but furnishes a vehicle to carry the water and kerosene to the engine in the form of spray and thus insures that these liquids are thoroughly mixed with the fuel mixture from the carbureter and are introduced uniformly into all the cylinders of the engine, which would not be the case if they were introduced in a liquid form.

The water alone, without the kerosene, is allowed to escape past the valve 15, drop by drop, all the time that the engine is running, until just before laying the engine up, and then the kerosene is introduced with the water for about a minute. The water has the effect of softening the carbon in the cylinder and keeps it from cutting the inside of the cylinder and the cylinder rings from wearing, and finally the added kerosene dissolves or liquifies the softened carbon so that it can easily be discharged from the exhaust.

It is very important to be able to inspect the dropping of the water and kerosene, especially the former, as they are being supplied to the cylinder. If too much water is delivered to the engine, the result is that the engine labors and requires double the amount of fuel to keep it in operation. But by turning the valve while the automobile is traveling, and watching through the sight-feed pipe 12 the water being supplied to the engine, and listening to the sound of the engine, the driver can readily adjust the valve 15 so that exactly the right amount of water is fed therethrough.

I claim:—

In combination with the internal combustion engine of an automobile, vessels for containing water and a decarbonizing fluid respectively, two upwardly extending transparent pipes, a third pipe communicating with the lower ends of said first-named pipes, all of said pipes being on the rear side of the dashboard of the automobile, conduits communicating at one end with the upper ends of the first-named pipes, valves for regulating the sizes of the communicating passages, said conduits communicating at the other end with said vessels respectively, a conduit communicating at one end with said third pipe and connected at the other end direct with the intake manifold of the engine, said third-named pipe being open to the admission of air, and means for regulating admission of air thereinto.

In testimony whereof I have hereunto set my hand in the presence of two subscribing witnesses.

JACK ADAMS.

Witnesses:
 FRANCIS M. WRIGHT,
 D. B. RICHARDS.